(12) United States Patent
Tanaka

(10) Patent No.: US 7,453,880 B2
(45) Date of Patent: Nov. 18, 2008

(54) MEDIA CONVERTER

(75) Inventor: Masao Tanaka, Tokyo (JP)

(73) Assignee: Allied Telesis Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/488,752

(22) PCT Filed: May 23, 2002

(86) PCT No.: PCT/JP02/05002

§ 371 (c)(1),
(2), (4) Date: Mar. 9, 2004

(87) PCT Pub. No.: WO03/026225

PCT Pub. Date: Mar. 27, 2003

(65) Prior Publication Data

US 2004/0247313 A1      Dec. 9, 2004

(30) Foreign Application Priority Data

Sep. 13, 2001   (JP) ............................. 2001-277649
Sep. 13, 2001   (JP) ............................. 2001-277650

(51) Int. Cl.
*H04L 12/28* (2006.01)
(52) U.S. Cl. .............. 370/395; 370/351; 370/355; 370/360
(58) Field of Classification Search ............. 370/351, 370/355, 360, 395, 402, 466
See application file for complete search history.

(56) References Cited

U.S. PATENT DOCUMENTS

| | | | | |
|---|---|---|---|---|
| 6,065,073 A * | 5/2000 | Booth | ......................... | 710/46 |
| 6,185,203 B1 * | 2/2001 | Berman | ..................... | 370/351 |
| 6,400,730 B1 * | 6/2002 | Latif et al. | .................. | 370/466 |
| 6,430,201 B1 * | 8/2002 | Azizoglu et al. | ............ | 370/535 |
| 6,516,352 B1 * | 2/2003 | Booth et al. | ................ | 709/250 |
| 6,775,799 B1 * | 8/2004 | Giorgetta et al. | ............ | 714/751 |
| 6,892,336 B1 * | 5/2005 | Giorgetta et al. | ............ | 714/704 |
| 6,904,053 B1 * | 6/2005 | Berman | ...................... | 370/466 |
| 7,010,607 B1 * | 3/2006 | Bunton | ....................... | 709/228 |
| 7,051,104 B1 * | 5/2006 | Cheng | ........................ | 709/227 |
| 2002/0031113 A1 * | 3/2002 | Dodds et al. | ................ | 370/352 |
| 2002/0104039 A1 * | 8/2002 | DeRolf et al. | ................. | 714/30 |

FOREIGN PATENT DOCUMENTS

JP   62-78935   4/1987

(Continued)

*Primary Examiner*—Edan Orgad
*Assistant Examiner*—Andrew C Lee
(74) *Attorney, Agent, or Firm*—McGinn IP Law Group, PLLC

(57) ABSTRACT

A media converter monitors whether a metal cable link is disconnected. If the metal cable link is disconnected, a desired invalid code other than pre-defined codes is successively transmitted toward a fiber optic cable to disconnect its link. If the metal cable link is not disconnected, a first auto negotiation is performed with the metal cable side to set a first line ability, and a second auto negotiation is performed with the fiber optic cable side based on the first line ability to set a second line ability. Subsequently, a third auto negotiation is performed again with the metal cable side based on the second line ability to finally determine the line ability between the metal and the fiber optic cables.

4 Claims, 6 Drawing Sheets

T-AN1: FIRST AUTO NEGOTIATION (METAL CABLE)
X-AN: AUTO NEGOTIATION (FIBER OPTIC CABLE)
T-AN2: SECOND AUTO NEGOTIATION (METAL CABLE)
DONE: AUTO NEGOTIATION COMPLETED
T-DIS: MISSING LINK (METAL CABLE)
T-DIS: MISSING LINK (FIBER OPTIC CABLE)

FOREIGN PATENT DOCUMENTS

| | | |
|---|---|---|
| JP | 1-218247 | 8/1989 |
| JP | 2001-24682 | 1/2001 |
| JP | 2001-86073 | 3/2001 |
| JP | 2001-111600 | 4/2001 |
| JP | 2001-186131 | 7/2001 |
| JP | 2001-358744 | 12/2001 |
| JP | 2002-354065 | 6/2002 |
| JP | 2002-261864 | 9/2002 |
| JP | 2003-18162 | 1/2003 |

* cited by examiner

T-AN1: FIRST AUTO NEGOTIATION (METAL CABLE)
X-AN: AUTO NEGOTIATION (FIBER OPTIC CABLE)
T-AN2: SECOND AUTO NEGOTIATION (METAL CABLE)
DONE: AUTO NEGOTIATION COMPLETED
T-DIS: MISSING LINK (METAL CABLE)
T-DIS: MISSING LINK (FIBER OPTIC CABLE)

MEDIA CONVERTER

TECHNICAL FIELD

The present invention relates to Gigabit networks and more particularly to a media converter for use with such a network, and its auto negotiation and link disconnection method.

BACKGROUND ART

Local area networks (LANs) are essential for networking a plurality of computers, servers, printers, and the like. In particular, since recent years have seen the achievement of standardization of 1000BASE-X (IEEE802.3z) and 1000BASE-T (IEEE802.3ab), Ethernet (registered trademark) LAN technologies have been playing the leading role in the age of high-speed multimedia networks.

Such a LAN can use fiber optic cables to extend its transmission distances. That is, the transmission distance can be extended by providing media converters each at both ends of a link between adjacent nodes to couple a fiber optic cable to a metal cable.

Recent years have also seen the spotlight on the FTTH (Fiber To The Home) which employs fiber optic cable lines extended to each home to freely exchange music, moving images, medical data or the like over the high-speed line. The advent of the FTTH age would require a media converter for connecting a fiber optic cable line to the metal cable of a computer in an office or at home. Thus, the media converter is an essential communication device for use with high-speed multimedia networks to come.

In general, the media converter includes physical layer devices each provided at a port for connecting to a fiber optic cable and a port for connecting to an UTP (Unshielded Twisted Pair) cable. Each physical layer device supports the MII (Media Independent Interface) specified in the IEEE802.3 standard.

Such a property of the media converter requires that the UTP cable and the fiber optic cable should be regarded as one cable including the media converter, and devices to be connected are often installed apart from each other. Accordingly, those generally employed have a missing link function of automatically disconnecting one link when the other link is disconnected. For example, when power is turned off or some trouble occurs causing the UTP cable device to be disconnected, the media converter automatically disconnects the fiber optic cable link.

When such a media converter is used to connect the UTP cable to the fiber optic cable, it is critical to properly exchange line abilities with each other in order to provide assured flow control. In particular, since the Gigabit Ethernet network is based on auto negotiation with a link partner to thereby set the optimum transmission mode, no flow control can be ensured without properly transferring line abilities. For example, to connect two devices of different abilities to each other, it is necessary to go through auto negotiation to know mutual abilities in order to set to the lower ability.

According to the Gigabit Ethernet standard for employing the fiber optic cable, the remote fault function can be used to send a link disconnect request to a device coupled with a fiber optic cable. The remote fault signal is held in a configuration packet and sent to a link partner during the auto negotiation on which the Gigabit Ethernet is based.

However, the link disconnect method utilizing the remote fault function has several problems. First, as described above, since the remote fault signal is contained in the configuration packet during the auto negotiation, the remote fault function is operable only between devices that are compatible with auto negotiation. Naturally, the remote fault function is not operable in the manual mode.

Secondly, some communication devices interpret the remote fault function in a different way, possibly resulting in the link disconnect request being not properly interpreted. For example, some devices interpret that the request does not mean a link disconnection because the remote fault signal being properly received indicates a proper connection between the devices. For this reason, in some cases, a link may not be disconnected using the remote fault function.

Thirdly, as a transitory problem, some earlier devices have not incorporated the remote fault function because the Gigabit Ethernet standard itself is a new one. A mixed device network incorporating such a device as having no remote fault function cannot ensure the disconnection of a link using the remote fault function.

It is therefore an object of the present invention to provide a link disconnection method that ensures link disconnection of a communication device having no remote fault function and a media converter having such a link disconnection function.

It is another object of the present invention to provide a media converter which can properly exchange line abilities and a method for auto negotiation in a network using the media converter.

DISCLOSURE OF THE INVENTION

Communications performed over Gigabit Ethernets via fiber optic cables employ a conversion between GMII (Gigabit Media Independent Interface) 8-bit (8B) data and 10-bit (10B) codes (8B-10B code conversion). The increase in bit width by two bits provides for a four times code capacity, resulting in some codes not being allocated. These non-allocated codes are generally handled as invalid codes, which may be successively received by a device causing it to fail to maintain its link status (see Clause 36.2.5.2.6 of IEEE802.3z standard).

A link disconnection method according to the present invention utilizes this property to ensure link disconnection of a device having no remote fault function, thereby implementing a missing link of a media converter.

According to a first aspect of the present invention, provided is a method for disconnecting a link between two communication devices, connected to each other via fiber optic cables, which conform to the Gigabit Ethernet standard. The method is characterized by successively transmitting a desired invalid code other than those pre-defined in the standard from one communication device via the fiber optic cable to the other communication device when the link is disconnected; and causing the other communication device having successively received the invalid code to disconnect the link.

According to a second aspect of the present invention, provided is a method for disconnecting a link of a media converter connected to a first communication device and a second communication device via a metal cable and a fiber optic cable, respectively, the first and second communication devices conforming to the Gigabit Ethernet standard. The method is characterized by monitoring whether a metal cable link is disconnected, to successively transmit a desired invalid code to the second communication device via the fiber optic cable when the metal cable link is disconnected, thereby disconnecting the link of the second communication device, the invalid code being other than those pre-defined in the standard to which the second communication device conforms.

In particular, the standard to which the second communication device conforms is the 1000BASE-X of IEEE802.3z standard. The codes pre-defined in the standard are 10-bit codes that are defined in an 8B/10B code conversion table, and the invalid code is a 10-bit code other than those. Preferably, the invalid code is one other than the codes of all zeros or ones.

According to a third aspect of the present invention, a media converter is provided which is connected to a first communication device and a second communication device via a metal cable and a fiber optic cable, respectively, the first and second communication devices conforming to the Gigabit Ethernet standard. The media converter includes first physical layer interface means for connecting to the metal cable; second physical layer interface means for connecting to the fiber optic cable; memory means, interposed between the first and second physical layer interface means, for temporarily storing data to be exchanged therebetween; and control means for allowing the first physical layer interface means to monitor whether a metal cable link is disconnected, to successively transmit a desired invalid code to the second communication device via the second physical layer interface means when the metal cable link is disconnected, the invalid code being other than those pre-defined in the standard to which the second communication device conforms, thereby disconnecting the link of the second communication device.

As described above, it is possible to implement link disconnection of a Gigabit Ethernet communication device employing a fiber optic cable by successively transmitting a non-conforming invalid code. Utilizing this property will make it possible to ensure link disconnection of a device having no remote fault function, thereby implementing a missing link of a fiber optic cable of the media converter.

In order to achieve a reliable flow control through proper transmission of line abilities, the present invention provides an auto negotiation method employed for use with a media converter for connecting to first and second transmission media of different types. The method is characterized by including the steps of performing a first auto negotiation with the first transmission medium side to set a first line ability; performing a second auto negotiation with the second transmission medium side based on the first line ability to set a second line ability; and performing a third auto negotiation with the first transmission medium side based on the second line ability to finally determine a line ability between the first and second transmission media.

In the first to third auto negotiations, it is characterized in that the lower line ability is set. Furthermore, in the first to third auto negotiations, it is characterized in that information on the transmission and reception function of a PAUSE (termination of transmission) frame is transmitted.

According to another aspect of the present invention, a media converter is provided which connects to first and second transmission media of different types. The media converter is characterized by including first physical layer interface means for connecting to a first transmission medium; second physical layer interface means for connecting to a second transmission medium; memory means, interposed between the first and second physical layer interface means, for temporarily storing data to be exchanged therebetween; and control means for allowing the first physical layer interface means to perform a first auto negotiation with the first transmission medium side to set a first line ability; allowing the second physical layer interface means to perform a second auto negotiation with the second transmission medium side using the first line ability to set a second line ability; and allowing the first physical layer interface means to perform a third auto negotiation with the first transmission medium side using the second line ability to finally determine a line ability between the first and second transmission media.

Each of the first and second physical layer interface means is characterized by supporting the GMII (Gigabit Media Independent Interface) specified in the IEEE802.3z standard. The control means is characterized by further having a missing link function of setting one physical layer interface means to a disconnected link status when the other physical layer interface means is in a disconnected link status, the missing link function being initiated to perform the first auto negotiation to the third auto negotiation again.

Preferably, the first transmission medium is a metal cable, while the second transmission medium is a fiber optic cable. The control means is characterized by being a FPGA (Field Programmable Gate Array).

On the other hand, according to an embodiment of the present invention, the present invention provides a method for performing auto negotiation in a network including a first media converter connected via a first metal cable to a first device for providing a first line ability; a second media converter connected via a second metal cable to a second device for providing a second line ability; and a fiber optic cable for connecting between the first media converter and the second media converter. The method is characterized by including: a first auto negotiation step of respectively acquiring the first line ability through auto negotiation between the first device and the first media converter, and the second line ability through auto negotiation between the second device and the second media converter; a second auto negotiation step of setting the lower one of the first line ability and the second line ability between the first media converter and the second media converter through the auto negotiation between the first media converter and the second media converter; and a third auto negotiation step of determining the lower one of the lower line ability and the first line ability through the auto negotiation between the first device and the first media converter as a line ability between the first device and the first media converter and determining the lower one of the lower line ability and the second line ability through the auto negotiation between the second device and the second media converter as a line ability between the second device and said second media converter.

As described above, it is possible to ensure the transmission of line abilities of both the first and second transmission media through the three-step auto negotiation procedure starting first with the first transmission medium (e.g., a metal cable) side, then with the second transmission medium (e.g., a fiber optic cable) side, and again with the first transmission medium side, thereby achieving flow control with high reliability.

When the media converter employs a fiber optic cable to extend the link between adjacent Gigabit switches, it is also possible to ensure transmission of mutual line abilities through the auto negotiation procedure of only three-step between the switches, thereby implementing a Gigabit data exchange with high reliability.

BEST MODE FOR CARRYING OUT THE INVENTION

1. Link Disconnection Using Media Converter

Figure 1:
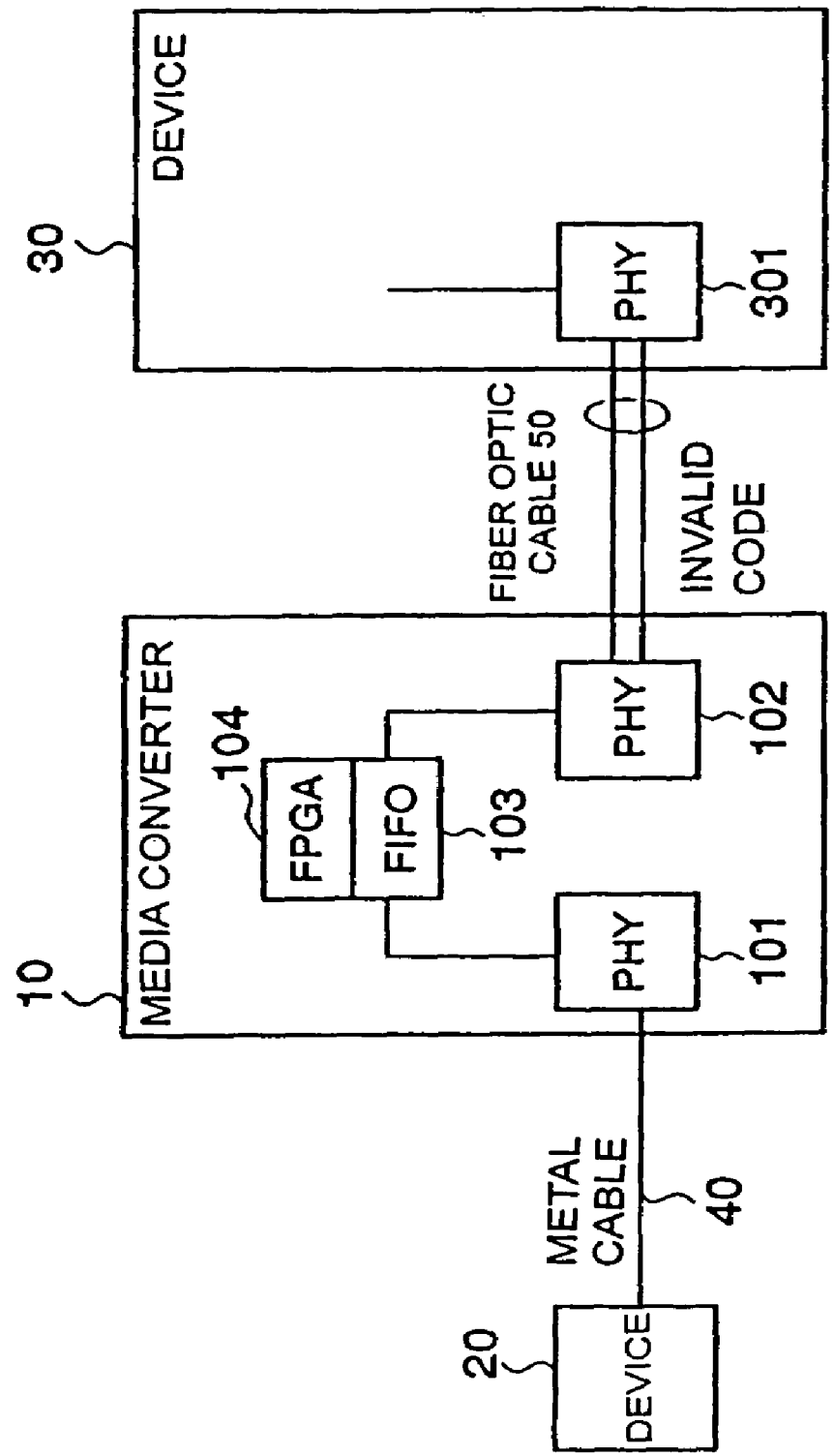
FIG. 1 is a block diagram illustrating a Gigabit Ethernet employing a media converter according to an embodiment of the present invention.

FIG. 1 is a block diagram illustrating a Gigabit Ethernet employing a media converter according to an embodiment of the present invention. For simplicity of illustration, a network is illustrated which includes a Gigabit media converter 10 and communication devices 20, 30, in which the media converter 10 is connected to the device 20 via a metal cable 40 such as a UTP cable and to the device 30 via a fiber optic cable 50. The devices 20, may also be a switch, a node, or a media converter in a LAN.

Referring to FIG. 1, the media converter 10 is provided at a pair of its ports with physical layer devices (PHYs) 101, 102, respectively, such that one physical layer device 101 is connected to the metal cable 40 and the other physical layer device 102 is connected to the fiber optic cable 50. Each of the physical layer devices 101, 102 according to this embodiment supports the GMII (Gigabit Media Independent Interface) specified in the IEEE802.3z standard.

Between the physical layer devices 101, 102, there is provided a chip that includes a FIFO (First in First out) memory 103 and a FPGA (Field Programmable Gate Array) 104, allowing the FIFO memory 103 to accommodate shifts in frequency between transmission and reception. Data received by one physical layer device is sequentially written into the FIFO memory 103, and read out in the order in which it has been written and then transmitted to the other physical layer device. As described later, the FPGA 104 incorporates an invalid code transmission procedure.

In this embodiment, a missing link being initiated would allow the media converter 10 to successively transmit an invalid code, discussed later, to the device 30. This causes a physical layer device 301 of the device 30 to fail to maintain its link status, thereby implementing the link disconnection of the fiber optic cable 50. Now, the operation of the media converter 10 according to this embodiment will be described below.

(Missing Link Operation of Media Converter)

Figure 2:
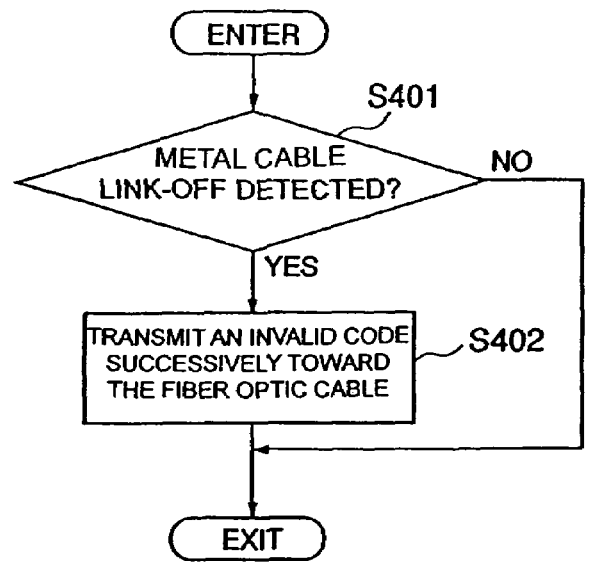
FIG. 2(A) is a schematic flowchart of a program incorporated into a FPGA in a media converter according to an embodiment of the present invention, FIG. 2(B) being a schematic view illustrating an example of an 8B/10B code conversion table employed in this embodiment.
Figure 2:
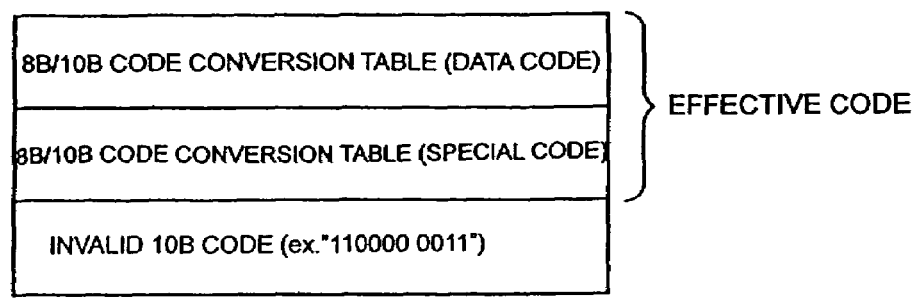

FIG. 2(A) is a schematic flowchart of a program incorporated into the FPGA of the media converter according to this embodiment of the present invention, FIG. 2(B) being a schematic view illustrating an example of an 8B/10B code conversion table employed in this embodiment.

When the physical layer device 101 detects a link_off of the metal cable (step S401), the FPGA 104 allows the physical layer device 102 to start a missing link of the fiber optic cable 50 and then allows the physical layer device 102 to successively transmit a 10-bit invalid code ('1100000011' in this case) to the device 30 via the fiber optic cable 50 (step S402).

(Invalid Code)

An 8B/10B code conversion is performed in a physical coding sub-layer (PCS) of the physical layer device 102 using the code conversion table (data codes and special codes) shown in FIG. 2(B).

Since the 8B/10B code conversion provides an increase in bit width from 8 bits to 10 bits, it is possible to define codes other than data codes. Some of these codes are allocated as special codes but the other codes are allocated to neither data codes nor special codes. These non-allocated invalid codes are treated as invalid codes, which cause a physical layer device to fail to maintain its link status when having successively received the invalid code (see Clause 36.2.5.2.6 of IEEE802.3z standard).

Although an invalid code to be used is not limited to any particular one, such an invalid code that is zero or one in all bits should be avoided because it can disturb the reception side DC balance. In this embodiment, '1100000011' was used as an invalid code.

(Operation of Invalid Code Reception Side)

Figure 3:
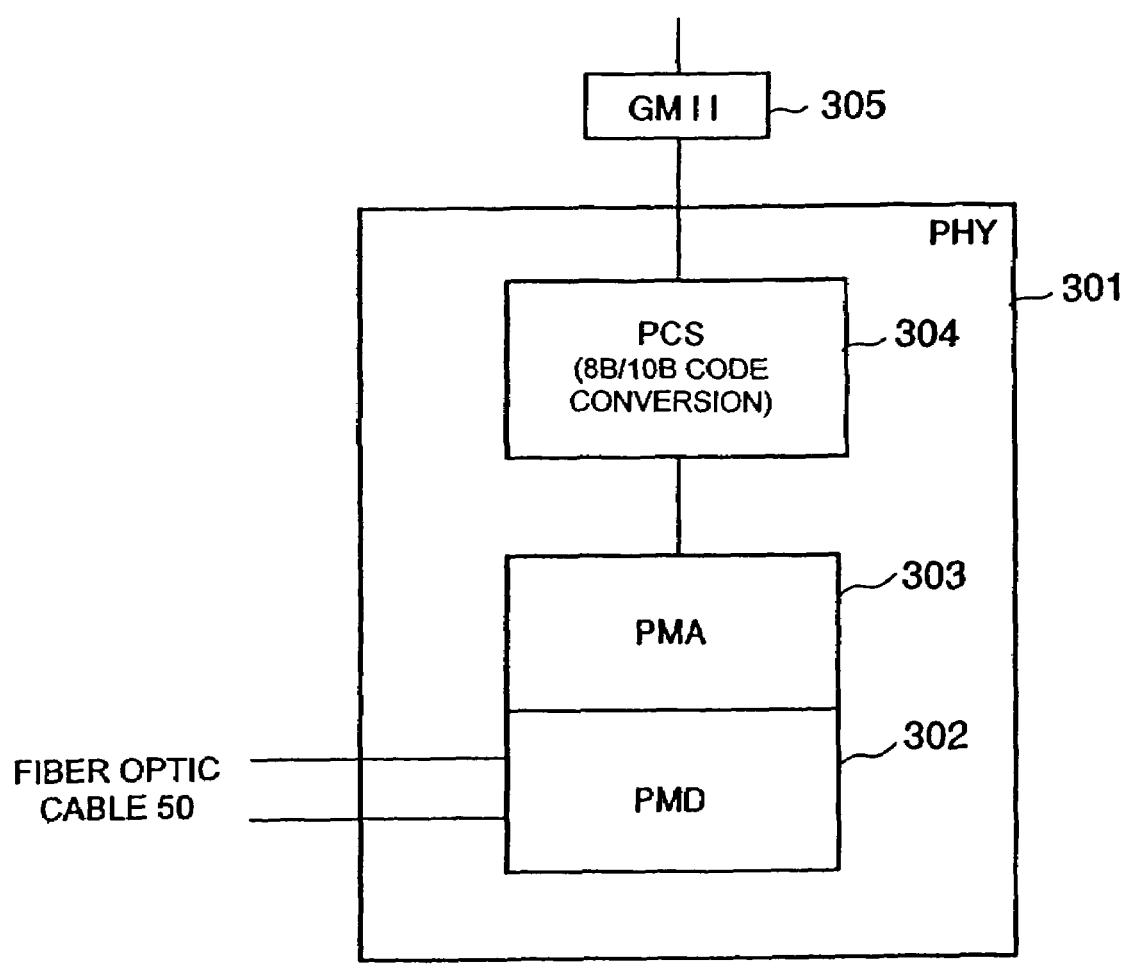
FIG. 3 is a block diagram illustrating the functional configuration of a conventional physical layer device.

FIG. 3 is a block diagram illustrating the functional configuration of a conventional physical layer device. In the figure, illustrated is the functional configuration of the physical layer device 301 of the device 30 shown in FIG. 1. An optical signal received via the fiber optic cable 50 is converted in a physical medium dependent (PMD) portion 302 to electrical serial data, which is then subjected to clock recovery and 10-bit parallel conversion in a physical medium attachment (PMA) portion 303. This 10-bit parallel data is 8B-10B decoded in a PCS 304 to output the resulting 8-bit received data and control data to a GMII 305.

As described above, the 8B-10B decoding in the PCS 304 is performed using the code conversion table (data codes and special codes) shown in FIG. 2(B); however, successive reception of the aforementioned invalid code will cause a failure in maintaining synchronization, resulting in a forced link disconnection. In other words, even in the case of the physical layer device 301 having no remote fault function, the link disconnection is performed only by successively receiving an invalid code from the fiber optic cable 50. It is therefore very effective to use an invalid code for a link disconnection of a fiber optic cable.

As described above, it is possible to implement a link disconnection by successively transmitting a non-conforming invalid code to a Gigabit Ethernet communication device employing a fiber optic cable. By utilizing this property, the link disconnection of a device can be ensured which has no remote fault function, to implement a missing link of a fiber optic cable of the media converter.

2. Auto Negotiation

When both the links of a media converter is normal, the auto negotiation is performed as described below.

Figure 4:
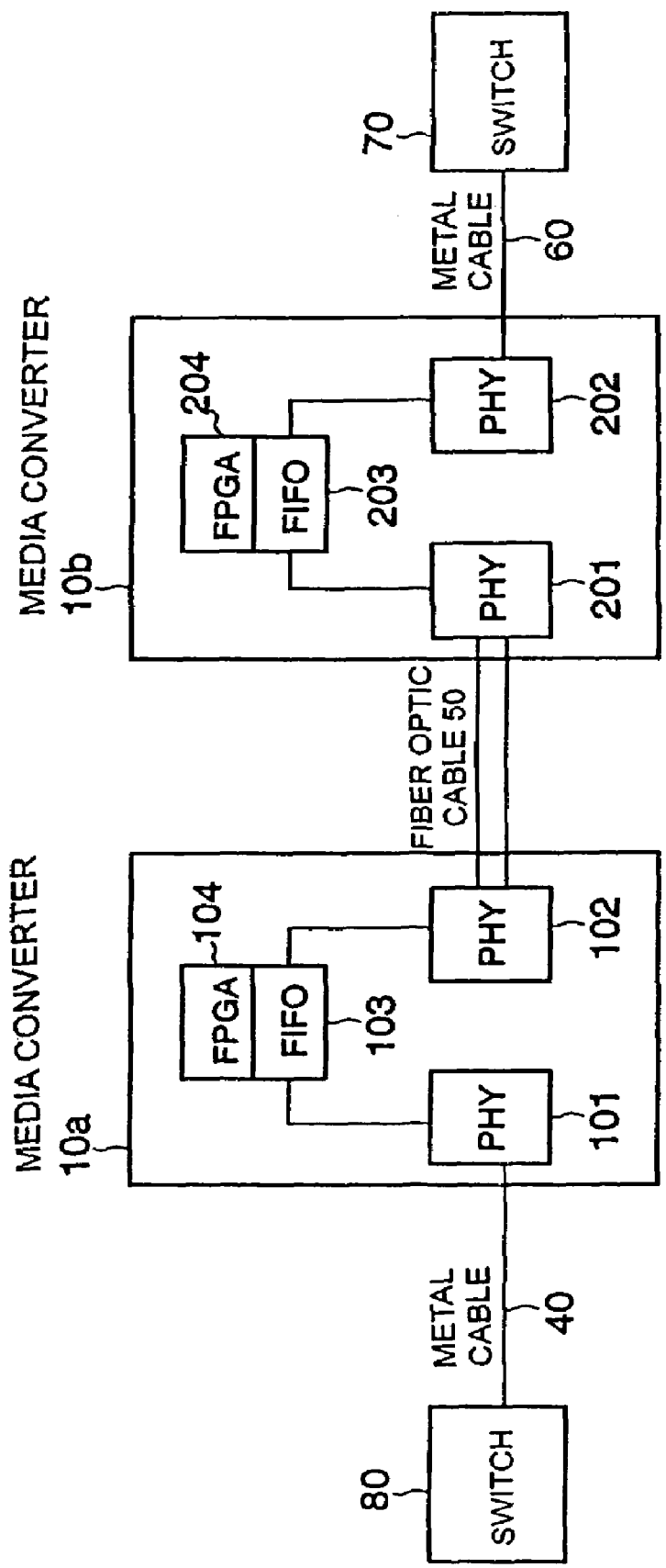
FIG. 4 is a block diagram illustrating a Gigabit Ethernet employing a media converter according to the present invention.

FIG. 4 is a block diagram illustrating a Gigabit Ethernet employing a media converter according to an embodiment of the present invention. For simplicity of illustration, a network is also illustrated in which Gigabit media converters 10a and 10b are connected to each other via the fiber optic cable 50, the media converter 10a is connected to a switch 80 via the metal cable 40 such as a UTP cable, and the media converter 10b is connected to a switch 70 via a metal cable 60.

Referring to FIG. 4, the media converter 10a is provided at a pair of its ports with physical layer devices (PHYs) 101, 102, respectively, such that one physical layer device 101 is connected to the metal cable 40 and the other physical layer device 102 to the fiber optic cable 50, respectively. Each of the physical layer devices 101, 102 according to this embodiment supports the GMII (Gigabit Media Independent Interface) specified in the IEEE802.3z standard.

Between the physical layer devices 101, 102, there is provided a chip that includes a FIFO (First in First out) memory 103 and a FPGA (Field Programmable Gate Array) 104, allowing the FIFO memory 103 to accommodate shifts in frequency between transmission and reception. Data received by one physical layer device is sequentially written into the FIFO memory 103, and read out in the order in which it has been written and then transmitted to the other physical layer device. As described later, the FPGA 104 incorporates an auto negotiation procedure.

The media converter 10b is provided at a pair of its ports with physical layer devices (PHYs) 201, 202, respectively, such that one physical layer device 201 is connected to the fiber optic cable 50 and the other physical layer device 202 to the metal cable 60. Each of the physical layer devices 201, 202 supports the GMII specified in the IEEE802.3z standard. The other configuration and functions of a FIFO memory 203 and a FPGA 204 are the same as those of the FIFO memory 103 and the FPGA 104 of the media converter 10.

In such a Gigabit network, information on line abilities (pause ability and asymmetric pause) is exchanged for arbitration to achieve the best status in order to perform flow control between the switches 80 and 70. Now, the operation of the auto negotiation according to the present invention and a media converter for implementing the auto negotiation will be detailed below.

(Operation of Media Converter)

Figure 5:
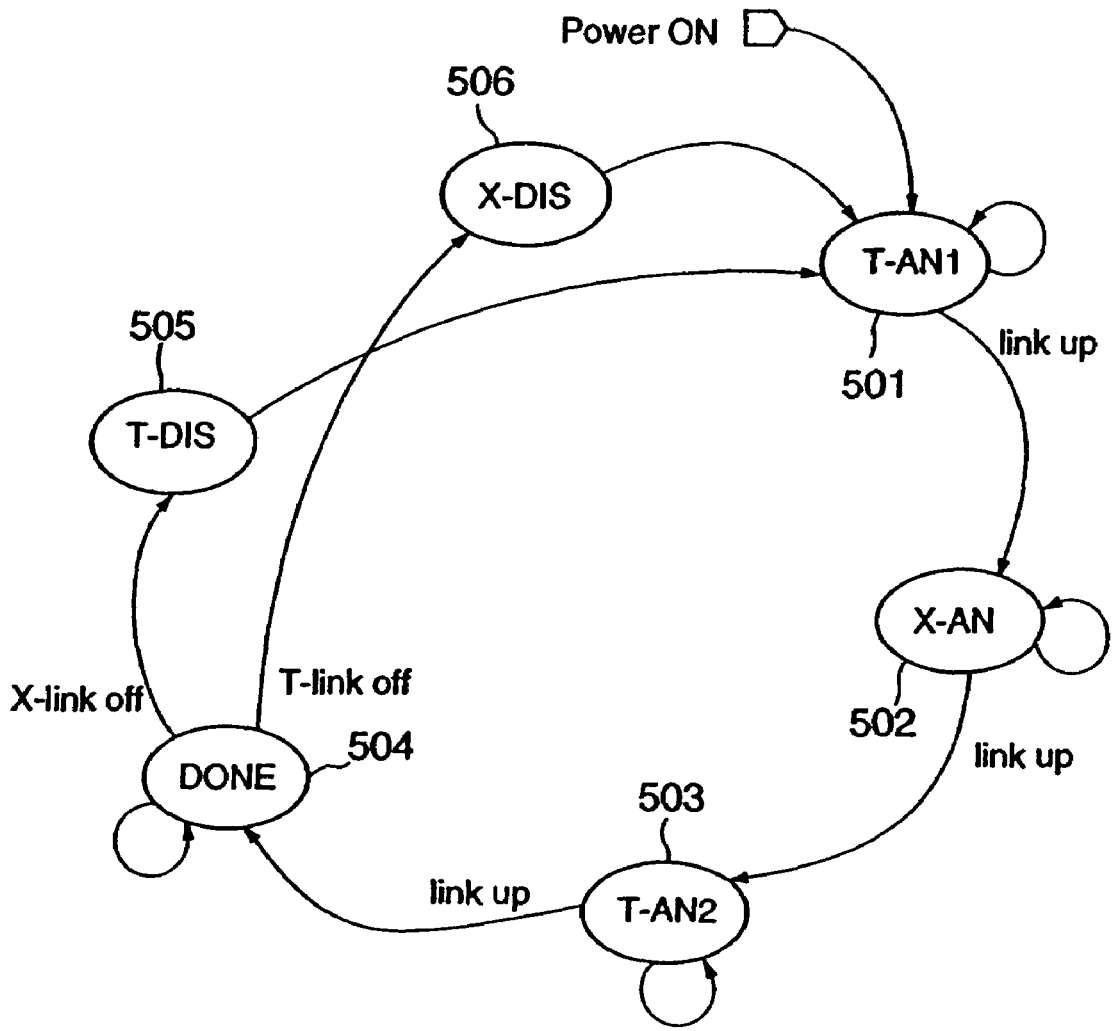
FIG. 5 is a view illustrating the state transition of a program incorporated into a FPGA in a media converter according to an embodiment of the present invention.

FIG. 5 is a view illustrating the state transition of a program incorporated into a FPGA in a media converter according to an embodiment of the present invention. By way of example, the operation is described with reference to the media converter 10a. The media converter 10b also operates in the same manner.

First, when power is turned on (Power_ON), the FPGA 104 of the media converter 10a allows the physical layer device 101 to perform auto negotiation (T-AN1) with the metal cable 40 side (501). At this point in time, since the line ability of the fiber optic cable 50 is unknown, it is assumed that it is in the highest status. Here, this auto negotiation (T-AN1) provides for negotiation with the corresponding port of the switch 80 on the metal cable 40, thereby setting to the lower ability Am1.

When the metal cable is linked up (link_up), the FPGA 104 performs auto negotiation (X-AN) with the fiber optic cable 50 side (502) for arbitration of the fiber optic cable side based on the ability Am1 that has been set through the auto negotiation (T-AN1) with the metal cable 40 side. That is, the arbitration is carried out such that the ability Am1 set through the auto negotiation (T-AN1) with the metal cable 40 side and the ability of a partner on the fiber optic cable are compared with each other to set to the lower ability Ao1.

When the fiber optic cable 50 is linked up (link_up), the FPGA 104 performs auto negotiation (T-AN2) again with the metal cable 40 side (503) for arbitration of the metal cable side based on the ability Ao1 that has been set through the auto negotiation (X-AN) with the fiber optic cable 50 side. That is, the arbitration is carried out such that the ability Ao1 set through the auto negotiation (X-AN) and the ability Am1 of the partner on the metal cable are compared with each other to set to the lower ability Am2. The auto negotiation (T-AN2) with the metal cable 40 side links up the metal cable 40 to complete the auto negotiation according to this embodiment (504), allowing an Ethernet frame to be exchanged between the switches 80 and 70.

When the physical layer device 102 detects a link-off (X_link_off) on the fiber optic cable, the FPGA 104 allows the physical layer device 101 to initiate a missing link (T-DIS) on the metal cable (505), the process being then allowed to return to the auto negotiation (T-AN1) with the metal cable 40 side. Conversely, when the physical layer device 101 detects a link-off (T_link_off) on the metal cable, the FPGA 104 allows the physical layer device 102 to initiate a missing link (X-DIS) on the fiber optic cable (506), the process being then allowed to return to the auto negotiation (T-AN1) with the metal cable 40 side as well.

As described above, it is possible to ensure the transmission of line abilities of both the metal cable 40 and the fiber optic cable 50 through the three-step auto negotiation starting first with the metal cable side (T-AN1), then with the fiber optic cable side (X-AN), and again with the metal cable side (T-AN2), thereby allowing the lower ability to be set. If the process starts from the auto negotiation (X-AN) with the fiber optic cable side, a more number of steps are required. Accordingly, the auto negotiation procedure according to this embodiment makes it possible to exchange Gigabit data with high reliability between the metal cable 40 and the fiber optic cable 50 only through the auto negotiation procedure of the three steps.

(System Operation)

FIGS. 6(A) to (E) are explanatory views illustrating an auto negotiation procedure according to an embodiment of the present invention. For simplicity of illustration, as with FIG. 4, a network is also illustrated in which Gigabit media converters 10a and 10b are connected to each other via the fiber optic cable 50, the media converter 10a is connected to the switch 80 via the metal cable 40, and the media converter 10b is connected to the switch 70 via the metal cable 60. However, it is assumed that the ability on the part of the metal cable 40 is A1 and the ability on the part of the metal cable 60 is A2, with A1>A2. For example, the ability A1 is provided for both the functions of receiving the PAUSE (termination of transmission) frame and an asymmetric function, while the ability A2 is provided for only the asymmetric function.

Figure 6A:
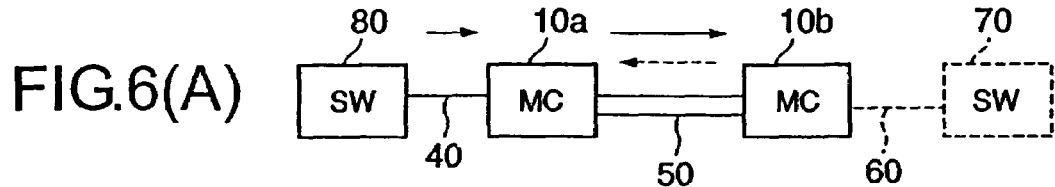
FIG. 6 is an explanatory view illustrating an auto negotiation procedure according to an embodiment of the present invention.
Figure 6B:
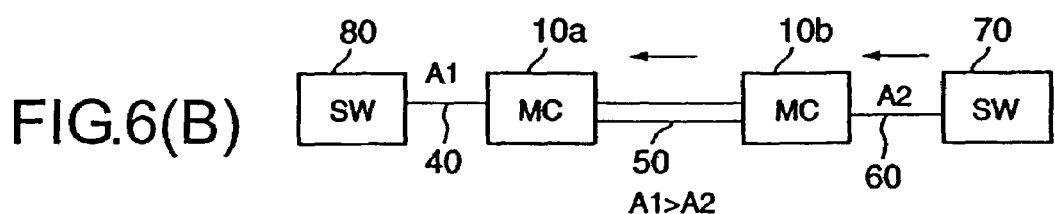

As shown in FIG. 6(A), for example, when the switch 70 is in the power-off condition, as described above, the media converters 10a, 10b are in the missing link state and thus initiate no auto negotiation procedure. As shown in FIG. 6(B), when the switch 70 is connected to the network and the media converters 10a and 10b are released from the missing link status, the auto negotiation procedure is started.

Figure 6C:
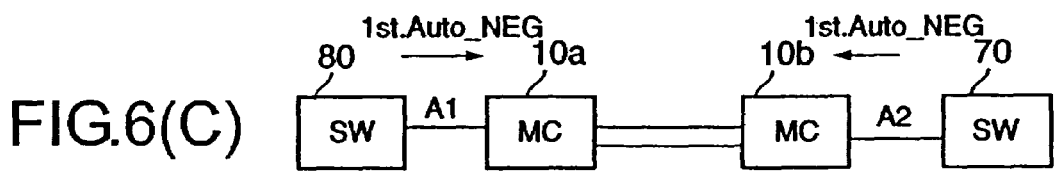

First, as shown in FIG. 6(C), the first auto negotiation (1st_Auto_Neg) allows the ability A1 of the switch 80 and the ability A2 of the switch 70 to be set to the media converters 10a and 10b, respectively.

Figure 6D:
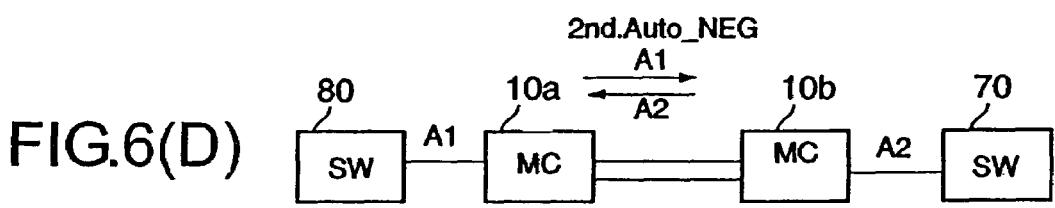

Subsequently, as shown in FIG. 6(D), between the media converters 10a and 10b, the second auto negotiation (2nd_Auto_Neg) allows the respectively set abilities A1 and A2 to be set to their partner's media converter. In other words, the media converter 10a knows A2 as the ability of the fiber optic cable 50, while the media converter 10b knows A1 as the ability of the fiber optic cable 50.

Figure 6E:
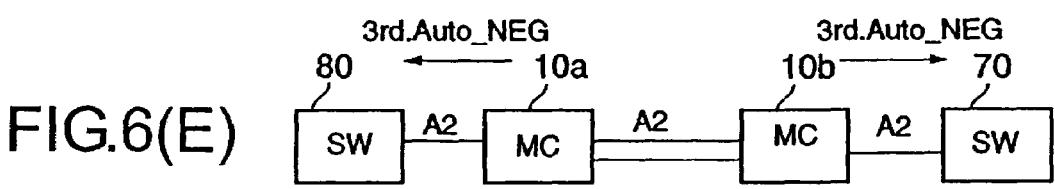

Finally, as shown in FIG. 6(E), the third auto negotiation (3rd_Auto_Neg) allows the media converter 10a to again arbitrate the ability A2 of the fiber optic cable 50 side and the ability A1 of the switch 80, while allowing the media converter 10b to arbitrate the ability A1 of the fiber optic cable 50 side and the ability A2 of the switch 70. Since A1>A2 as described above, the lower ability is set, thereby allowing the entire segment between the switches 80 and 70 is set to the ability A2. This ensures exchanging of a Gigabit Ethernet frame between the switches 80 and 70.

For example, suppose that the ability A1 is provided for both the functions of receiving the PAUSE (termination of transmission) frame and an asymmetric function, while the ability A2 is provided for only the asymmetric function. Then, the entire segment between the switches 80 and 70 is set to an ability having only the asymmetric function. Accordingly, in this case, the switch 80 supports the reception of the PAUSE frame from the switch 70, whereas no PAUSE frame is sent to the switch 70.

As described above, according to the present invention, it is possible to ensure the transmission of line abilities of both the first and second transmission media through the three-step auto negotiation procedure starting first with the first transmission medium (e.g., a metal cable), then with the second transmission medium (e.g., a fiber optic cable), and again with the first transmission medium, thereby achieving flow control with high reliability.

When the media converter employs a fiber optic cable to extend the link between adjacent Gigabit switches, it is also possible to ensure transmission of mutual line abilities through the auto negotiation procedure of only three-step between the switches, thereby implementing a Gigabit data exchange with high reliability.

The invention claimed is:

1. An auto negotiation method for use with a media converter for connecting to first and second transmission media of different types, the method comprising:

performing a first auto negotiation with the first transmission medium side to set a first line ability;

performing a second auto negotiation with the second transmission medium side based on said first line ability to set a second line ability; and performing a third auto negotiation with said first transmission medium side based on said second line ability to finally determine a line ability between said first and second transmission media, wherein, in the first to third auto negotiations, information on the transmission and reception function of a PAUSE (termination of transmission) frame is transmitted.

2. The auto negotiation method according to claim 1, wherein, in the first to third auto negotiations, information on the transmission and reception function of a PAUSE (termination of transmission) frame is transmitted.

3. A media converter for connecting to first and second transmission media of different types, the media converter comprising:

first physical layer interface means for connecting to a first transmission medium;

second physical layer interface means for connecting to a second transmission medium;

memory means, interposed between said first and second physical layer interface means, for temporarily storing data to be exchanged therebetween; and control means for allowing said first physical layer interface means to perform a first auto negotiation with said first transmission medium side to set a first line ability; allowing said second physical layer interface means to perform a second auto negotiation with the second transmission medium side using said first line ability to set a second line ability; and allowing said first physical layer interface means to perform a third auto negotiation with said first transmission medium side using said second line ability to finally determine a line ability between said first and second transmission media, wherein said control means further comprises a missing link function of setting one physical layer interface means to a disconnected link status when the other physical layer interface means is in a disconnected link status, said missing link function being initiated to perform said first auto negotiation to said third auto negotiation again.

4. An auto negotiation method employed for use with a media converter for connecting to first and second transmission media of different types, the method comprising:

performing a first auto negotiation with the first transmission medium side to set a first line ability;

performing a second auto negotiation with the second transmission medium side based on said first line ability to set a second line ability; and performing a third auto negotiation with said first transmission medium side based on said second line ability to finally determine a line ability between said first and second transmission media, wherein, in the first to third auto negotiations, the lower line ability is set, and wherein, in the first to third auto negotiations, information on the transmission and reception function of a PAUSE (termination of transmission) frame is transmitted.

* * * * *

UNITED STATES PATENT AND TRADEMARK OFFICE
CERTIFICATE OF CORRECTION

PATENT NO. : 7,453,880 B2  Page 1 of 1
APPLICATION NO. : 10/488752
DATED : November 18, 2008
INVENTOR(S) : Masao Tanaka It is certified that error appears in the above-identified patent and that said Letters Patent is hereby corrected as shown below:

Title Page, Item (73) Assignee:
Change (73) Assignee:   Allied Telesis Kabushiki Kaisha to

(73) Assignee:   Allied Telesis Holdings K.K.

Signed and Sealed this

Thirtieth Day of December, 2008

JON W. DUDAS
*Director of the United States Patent and Trademark Office*